(12) United States Patent
Chang et al.

(10) Patent No.: US 7,730,364 B2
(45) Date of Patent: Jun. 1, 2010

(54) SYSTEMS AND METHODS FOR PREDICTIVE FAILURE MANAGEMENT

(75) Inventors: Shu-Ping Chang, Shrub Oak, NY (US); Xiaohui Gu, Chappaqua, NY (US); Spyridon Papadimitriou, White Plains, NY (US); Philip Shi-lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 441 days.

(21) Appl. No.: 11/696,795

(22) Filed: Apr. 5, 2007

(65) Prior Publication Data

US 2008/0250265 A1     Oct. 9, 2008

(51) Int. Cl.
*G06F 11/00* (2006.01)
(52) U.S. Cl. ....................................... 714/47
(58) Field of Classification Search ............. 714/2–6, 714/15–18, 25, 27, 37–39, 47–50
See application file for complete search history.

(56) References Cited

U.S. PATENT DOCUMENTS

| | | | | |
|---|---|---|---|---|
| 6,115,713 | A * | 9/2000 | Pascucci et al. | 707/10 |
| 6,922,801 | B2 * | 7/2005 | Archibald et al. | 714/723 |
| 7,103,509 | B2 * | 9/2006 | Shah et al. | 702/185 |
| 7,349,826 | B2 * | 3/2008 | Subramanian et al. | 702/185 |
| 2005/0144264 | A1 * | 6/2005 | Gruhn et al. | 709/223 |
| 2008/0126857 | A1 * | 5/2008 | Basham et al. | 714/25 |

OTHER PUBLICATIONS

Abadi et al.; The Design of the Borealis Stream Processing Engine; Proceedings of the 2005 CIDR Conference; 2005; 13 pages.
Balazinska et al.; Fault-Tolerance in the Borealis Distributed Stream Processing System; SIGMOD 2005; Jun. 14-16, 2005; Baltimore, MD US; 12 pages.
Palmer et al.; Density Biased Sampling: An Improved Method for Data Mining and Clustering; SIGMOD 2000; 22 pages.
J-H Hwang et al.; High-Availability Algorithms for Distributed Stream Processing; Proceedings of ICDE, 2005; 12 pages.
J-H Hwang et al.; A Cooperative, Self-Configuring High-Availability Solution for Stream Processing; Proc. of ICDE, 2007; 10 pages.
Papadimitriou et al.; LOCI: Fast Outlier Detection Using the Local Correlation Integral; Proceeding of the ICDE, 2003; 26 pages.
Murray et al.; Machine Learning Methods for Predicting Failures in Hard Drives: A Multiple-Instance Application; Jounal of Machine Learning Research 6; 2005; 34 pages.

(Continued)

*Primary Examiner*—Nedeem Iqbal
(74) *Attorney, Agent, or Firm*—Tutunjian & Bitetto, P.C.; Kenneth Corsello

(57) ABSTRACT

A system and method for using continuous failure predictions for proactive failure management in distributed cluster systems includes a sampling subsystem configured to continuously monitor and collect operation states of different system components. An analysis subsystem is configured to build classification models to perform on-line failure predictions. A failure prevention subsystem is configured to take preventive actions on failing components based on failure warnings generated by the analysis subsystem.

24 Claims, 9 Drawing Sheets

OTHER PUBLICATIONS

Cai et al.; Utility-Driven Proactive Management of Availability in Enterprise-Scale Information Flows; Proc. of Middleware; 2006; 20 pages.

Shah et al.; Highly-Available, Fault-Tolerant, Parallel Dataflows; Proc. of SIGMOD; 2004; 14 pages.

Vaidyanathan et al.; Analysis and Implementation of Software Rejuvenation in Cluster Systems; Proc. of Sigmetrics; 2004; 10 pages.

J. S. Vitter; Random Sampling with a Reservoir; ACM Transactions on Mathematical Software, vol. 11, No. 1, Mar. 1985; 21 pages.

* cited by examiner

SYSTEMS AND METHODS FOR PREDICTIVE FAILURE MANAGEMENT

GOVERNMENT RIGHTS

This invention was made with Government support under Contract No.: H98230-05-3-001 awarded by the U.S. Department of Defense. The government has certain rights in this invention.

BACKGROUND

1. Technical Field

The present invention relates to failure management in distributed systems and more particularly to systems and methods for using continuous failure predictions to provide proactive failure management for distributed cluster systems.

2. Description of the Related Art

Many emerging applications call for sophisticated real-time processing over dynamic data streams such as sensor data analysis and network traffic monitoring. In these applications, data streams from external sources flow into a data stream management system where they are processed by different continuous query (CQ) operators (e.g., join, union, aggregation). Distributed cluster systems have been developed to achieve scalable CQ processing. However, cluster systems are vulnerable to various software and hardware failures where any node failure may stall the query processing. For example, in a deployed cluster system consisting of several hundreds of processing nodes, the system log records 69 significant failure incidents during a one month period.

On the other hand, fault tolerance is of critical importance for CQ processing that requires continuous system operation. System administrators are often overwhelmed by the tasks of recovering the system from failures under time pressure. Thus, it is imperative to provide autonomic failure management for large-scale cluster systems to achieve fault-tolerant CQ processing.

Previous work on fault-tolerant cluster systems has been focused on developing specific failure management schemes. The Flux operator in Shah et al. "Highly-available, fault-tolerant, parallel dataflows". Proc. of SIGMOD, 2004, encapsulates coordination logic for fail-over and recovery into an opaque operator used to compose parallelized dataflows. Flux achieves highly available dataflow processing by allowing the processing of unaffected partitions to continue while recovering the operations of failed partitions. The Borealis project described in Abadi et al., "The Design of the Borealis Stream Processing Engine." Proc. of CIDR, 2005, also extensively addressed the problem of fault tolerant stream processing. Balazinska et al. in "Fault-Tolerance in the Borealis Distributed Stream Processing System." Proc. of SIGMOD, 2005, proposed a replication-based approach to fault tolerant distributed stream processing, which allows a user to trade availability for consistency.

Hwang et al. in "High Availability Algorithms for Distributed Stream Processing." Proc. of ICDE, 2005, studied various failure recovery approaches and quantitatively characterized their runtime overhead and recovery time tradeoffs. Hwang et al. in "A Cooperative, Self-Configuring High-Availability Solution for Stream Processing." Proc. of ICDE, 2007 also proposed a parallel backup and recovery approach that performs cooperative checkpointing and failure recovery for one query using a set of servers.

Failure prediction has been studied under different contexts. The SMART project described in Murray et al. G. F. "Comparison of machine learning methods for predicting failures in hard drives." Journal of Machine Learning Research, 2005, has studied different nonparametric statistical approaches to disk failure predictions. Since prediction errors for disk failure cause significant financial penalty, the focus of SMART is on selecting proper features to avoid false-alarms as much as possible. Software rejuvenation as described in Vaidyanathan et al. "Analysis and Implementation of Software Rejuvenation in Cluster Systems." Proc. of SIGMETRICS, 2004, is another proactive technique that periodically stops running software, clean its internal state, and restarts it to prevent unexpected failures due to software aging.

Cai et al. in "Utility-Driven Proactive Management of Availability in Enterprise-Scale Information Flows." Proc. of Middleware, 2006, proposes a utility-driven approach to augmenting the active-passive scheme with tunability between normal operation cost and recovery.

SUMMARY

In contrast, the present disclosure focuses on employing stream-based failure predictions to achieve efficient fault-tolerant CQ processing in cluster systems. Advanced failure warnings permit timely preventive actions (e.g., isolation, backup, migration) to minimize the failure impact on running queries. Moreover, with failure predictions, preventive actions are taken only on abnormal hosts/operators to greatly reduce fault tolerance cost.

Different from the above work, the present embodiments focus on providing efficient, light-weight, and self-evolving failure prediction techniques for cluster systems using various stream collection and processing capabilities provided by cluster systems themselves.

A system and method for using continuous failure predictions for proactive failure management in distributed cluster systems includes a sampling subsystem configured to continuously monitor and collect operation states of different system components. An analysis subsystem is configured to build classification models to perform on-line failure predictions. A failure prevention subsystem is configured to take preventive actions on failing components based on failure warnings generated by the analysis subsystem.

A system and method for proactive failure management in distributed cluster systems includes continuously monitoring and collecting operation states of different components, which include at least one of software and hardware components, building classification models to perform on-line failure predictions for the components, and taking preventive actions on failing components based on failure warnings generated by the failure predictions.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
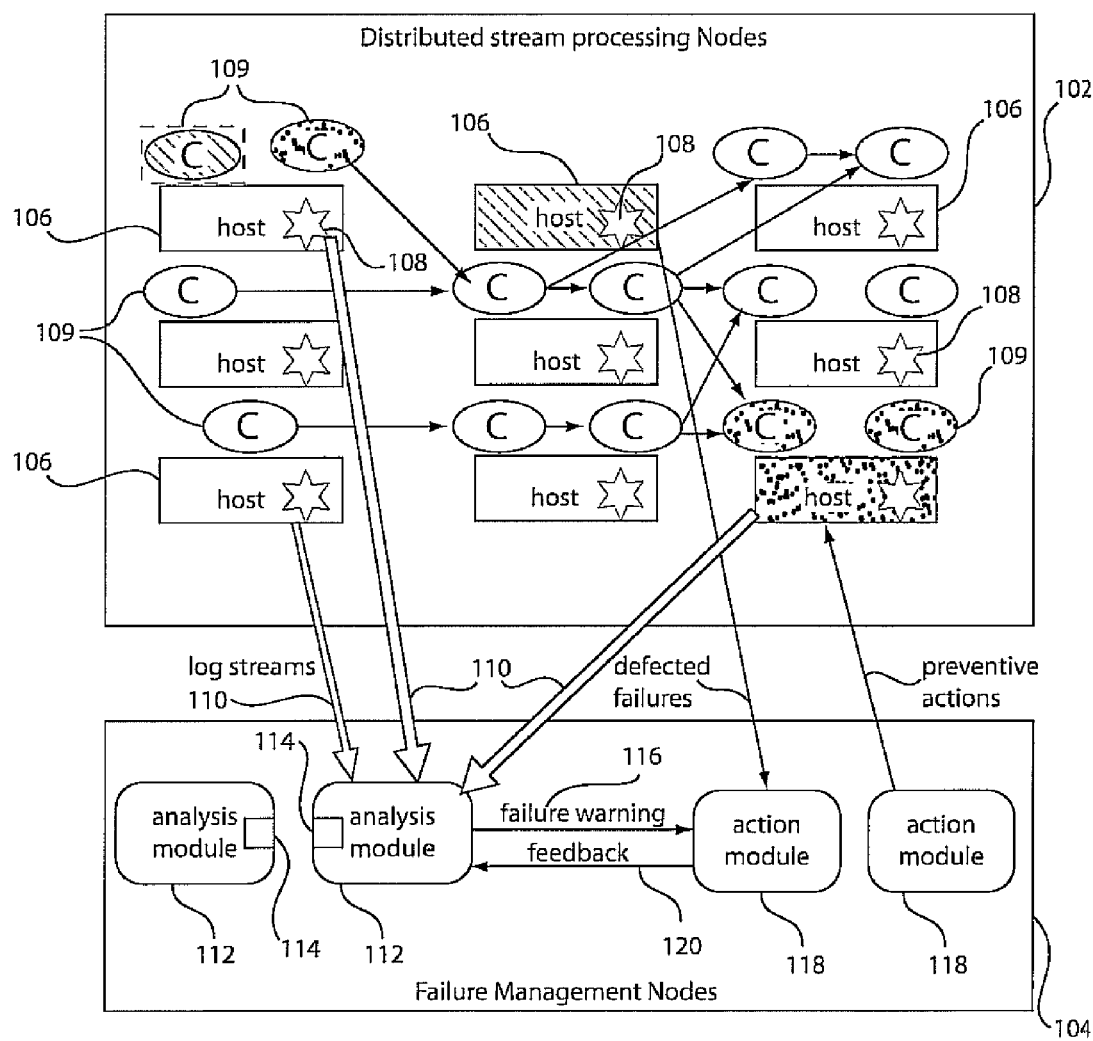
FIG. 1 is a block/flow diagram showing a system/method for predictive failure management for cluster systems in accordance with one embodiment.

In accordance with present principles, systems and methods for a stream-based predictive failure management framework for cluster systems are presented. In accordance with particularly useful embodiments, a tunable failure management solution that can achieve customizable tradeoff between fault tolerance and resource cost based on a user-defined reward function is provided. The prediction model can dynamically adjust itself by using a pre-failure interval as a tuning knob to control its detection rate and false-alarm rate so that the cluster system can achieve tolerable failure penalty under resource constraints.

An adaptive log stream sampling is employed that can collect most useful log data within an overall resource constraint. First, the log stream sampling rate is dynamically adjusted based on the failure prediction results. For each monitored object whose state is classified as normal, a low sampling rate is used to reduce resource cost. When the prediction model raises an alarm on the object, the sampling rate is increased to collect more precise information on abnormal objects. Second, reservoir sampling is employed as is known in the art (see e.g., J. Scott Vitter. "Random Sampling with a Reservoir", ACM TOMS, 11(1), 1985) to incrementally maintain a desired size of a training dataset. Non-uniform sample retention probabilities are employed to keep most important data within resource constraints.

Self-evolving, stream-based failure prediction models have been developed in accordance with the present principles that can continuously capture the evolving failure patterns under dynamic stream workloads using stream-based learning methods. The prediction model maintains an ensemble of classifiers trained with different pre-failure intervals, and dynamically selects the optimal classifier with a best tradeoff between detection rate and false-alarm rate. The failure prediction model is also resilient to workload changes by incorporating both external workload features and internal operator features in the classifiers.

An iterative inspection is provided to ensure smooth stream processing in the presence of failure prediction errors. The system can perform proper preventive actions based on the predicted failure type and failing object type (i.e., a host or an operator). The system can automatically release the inspection on a suspicious object upon which the prediction model issues a false-alarm.

A prototype of the stream-based predictive failure management framework has been implemented as part of a cluster system management infrastructure. The experimental results show that (1) the failure prediction schemes can achieve good prediction accuracy with low overhead for a number of typical software failures (e.g., memory leak, buffer depletion, CPU starvation); (2) the tunable failure management solution can achieve better cost-efficiency (i.e., larger reward) than reactive or proactive approaches; and (3) self-evolving stream-based failure prediction model can achieve better performance than non-evolving models in dynamic stream environments.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a failure management system and method 100 are depicted in accordance with the present principles. System 100 includes a failure management framework 102 employed to monitor and predict failures in a distributed stream processing environment (e.g., a cluster system 104). Cluster system 104 includes a plurality of host nodes 106. Host nodes 106 represent servers, computers or other processing nodes in the system 104. A monitoring sensor or sensors 108 are deployed on every stream processing node 106, which continuously collect log data about a local host 106 and running operators to generate log streams 110. The hosts 106 run one or more application components 109 which may provide useful information in the form of log streams 110. Then, adaptive sampling is performed on the original log stream based on the state or healthiness of the monitored object (i.e., a host or an operator). Thus, sensors 108 can deliver the most useful information to the analysis components of the framework 102 with low resource cost.

The analysis components reside on a master node or framework 102 that continuously analyzes received log streams 110 to track the evolving behavior of monitored objects and perform failure predictions using stream-based classification methods.

The master node 102 may be employed separately from the system 104 to decouple failure prediction analysis from normal query processing for better manageability. Multiple master nodes can be employed if the analysis workload cannot be handled by a single host. Specifically, for each failure type, an analysis component or module 112 maintains a failure prediction model 114 that can classify all sample values associated with the failure type into three states: normal, pre-failure and failure.

The failure state is described similarly as the failure type using a given predicate that characterizes what is being predicted. The pre-failure state corresponds to a dynamically defined time interval "preceding" the failure, called a pre-failure interval. The model 114 will raise failure alarms or warning 116 when measurements fall into the pre-failure state. These alarms 116 are employed by action modules 118 to provide preventative actions to pre-failure or failed hosts 106. Thus, the proactiveness of the failure management system 104 can be adjusted by training the prediction model 114 using different pre-failure intervals.

Upon receiving a failure warning, an inspection component or action module 118 can take proper preventive actions (e.g., isolating "bad" operators, migrating "good" operators, creating replacement operators). The inspection component 118 can provide feedback 120 to the analysis component 112. Based on the feedback information, the prediction models 114 can continuously evolve themselves to adapt to dynamic stream environments.

Problem Formulation: Consider a shared large-scale cluster system 102 including hundreds of networked hosts, which can execute a large number of continuous queries concurrently, Each continuous query includes a set of operators 109 connected into a directed acyclic graph that can be placed at different hosts 106. These operators are typically provided by different developers, which are often failure-prone. Recent studies showed that software faults are the major source of system failures. Common software faults include program bugs such as memory leaks, buffer overflow, and CPU starvation caused by the mistakes of application developers. Sometimes, a stream processing operator may include malicious code uploaded by untrustworthy users. Thus, the focus is to manage software faults and minimize their negative impact on the operation of the whole cluster system, although hardware faults may be handled in a similar fashion.

A simple solution would be isolating operator from each other by running each operator in a separate virtual machine and backup all operators to achieve fault-tolerance. However, this simple approach can be impractical in terms of performance degradation (e.g., communication between every two operators has to pass across different virtual machines), and resource cost (e.g., replicating computation of each operator), especially for high-volume data stream processing. To address the problem, a solution is to closely watch each running operators, generate failure alarms by analyzing the collected measurements, and perform on-demand preventive actions only when they are necessary.

Application software faults can lead to different types of failures such as resource exhaustion causing query result loss or query processing interruption. It will be assumed that different failure types can be described by failure predicates, which are provided by the application developers or system administrators. For each failure type, a classification model is built that can partition all sample values associated with the failure type into three states: normal, pre-failure and failure. Other states may also be employed.

The failure state is described similarly as the failure type using a given predicate that characterizes what is being predicted. The pre-failure state corresponds to a set of values in a dynamically defined time interval "preceding" the failure. The rest values correspond to the normal state.

Depending on the nature of the failure, the pre-failure state can include various numbers of feature points. In experiments conducted be the present inventors, it was observed that many stream application failures present early abnormal symptoms. For example, the performance bottlenecks caused by the memory leak fault are often preceded by the symptoms of increased buffer queue length and reduced data receiving rate. Thus, the present study focuses on exploring the prediction opportunity for those latent software failures.

Figure 2:
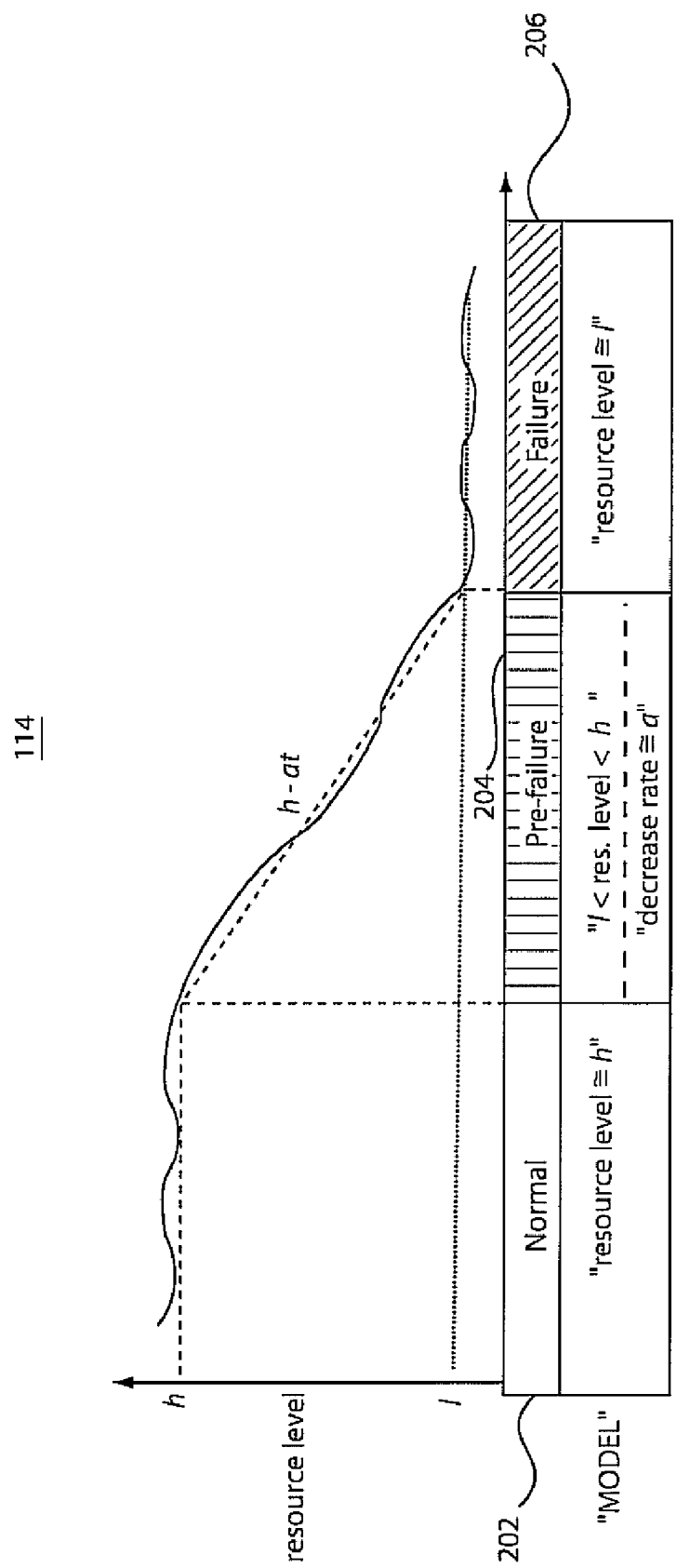
FIG. 2 is a diagram showing failure prediction based on a single metric in accordance with one illustration of the present principles.

Referring to FIG. 2, a failure prediction model 114 is illustratively shown in accordance with one exemplary embodiment. The model will send out failure warnings when measurements fall into a pre-failure state 204. Based on trajectory of measurement values, the analytic model 114 can also calculate the confidence probability and estimate the time-to-failure) interval. A failure 206 can be in the form of failure type X and will happen within time T with probability p.

The high-level concepts are shown in the simple example of FIG. 2. A host's resource availability level "resource level" or res.level (e.g., memory or disk space) is shown over time. For example, in the failure state 206 the resource level drops below l, which is defined as "available resource is too low" (e.g., resource level approximately less than l). A pre-failure state 204 corresponds to l<resource level<h, where h is the high threshold. A normal state 202 corresponds to res.level approximately equal to h. Note that the criteria for each level may be set according to any relevant parameters and may be customized for each model.

Different from previous work, predictive failure management provides a tunable solution that can adjust the degree of proactiveness based on the application requirements and current system load condition. The prediction model 114 can be dynamically adjusted using, e.g., the pre-failure interval "PF" as a tuning knob to achieve the optimal trade-off between the detection rate and false-alarm rate. At one extreme, if we set PF=0, predictive failure management becomes a conventional reactive approach where the pre-failure state 204 is always empty and no alarm will be generated before failure happens. At the other extreme, if we set PF=infinity, predictive failure management becomes a traditional proactive approach that performs preventive actions unconditionally (e.g., backup all operators at all time).

In many cases, the optimal solution lies in-between the two extremes. Let P denote the original failure penalty and P' denote the reduced failure penalty after a preventive action is taken. The failure penalty can be described using different metrics such as data loss, service down time, or service level violation rate. Let $N_{tp}$ denote the number of true positive failure predictions where predicted failures do happen. Let $N_{fn}$ denote the number of false-negative failure predictions where the prediction model fails in sending out alarms. Without failure prediction, the failure penalty of the system can be defined by $(N_{tp}+N_{fn})P$. With failure prediction, the failure penalty of the system can be reduced to $N_{tp}P'+N_{fn}P$, $P' \leq P$. Thus, the failure penalty reduction achieved by the predictive failure management is $$N_{tp}(P-P'), P' \leq P \qquad (1)$$

Let $N_{fp}$ denote the false positive predictions where the prediction model sends alarms during the normal state, and $N_{tn}$ denote true negative cases. On the other hand, predictive failure management also incurs extra resource cost because of the preventive actions. Let C denote the fail-stop failure recovery cost and C' denote failure prevention and recovery cost. Thus, the total cost of the predictive failure management system can be described as $$(N_{fp}+N_{tp})C'+(N_{fn})C, C \leq C' \qquad (2)$$

Definition 1: The detection rate $A_D$ and false alarm rate $A_F$ are defined in a standard way as $$A_D = \frac{N_{tp}}{N_{tp}+N_{fn}}, \qquad (3)$$

$$A_F = \frac{N_{fp}}{N_{fp}+N_{tn}}$$

Intuitively, a larger pre-failure interval PF leads to a higher failure detection rate and thus better fault tolerance since more measurement points will trigger the system to raise failure warnings. However, a larger pre-failure interval can also lead to higher false alarm rates and thus more preventive management cost C'. To quantify the performance of a failure management system, a reward function is defined that denotes the failure penalty reduction per unit resource cost.

Definition 2: Reward function: The reward function, which is used to choose the tradeoff between correct and false predictions is defined by:

$$R = \frac{(P-P')N_{tp}}{C'(N_{tp}+N_{fp})+CN_{fn}} \qquad (4)$$

$$R = \frac{(P-P')}{C} \cdot \frac{A_D}{\left(\frac{C'}{C}-1\right)A_D + \frac{C'(N_{tn}+N_{fp})}{C(N_{tp}+N_{fn})}(A_F+1)} \qquad (5)$$

Thus, the reward function is maximized for $A_F=0$ and $A_D=1$. This ideal goal is typically unattainable. The ratio C'/C and $(N_{tn}+N_{fp})/(N_{tp}+N_{fn})$ will determine the optimal tradeoff point. Therefore, a goal is to dynamically configure each prediction model with a proper pre-failure interval PF that can maximize the reward value with a desired combination of $A_D$ and $A_F$ for achieving a fault-tolerant cluster system with low resource cost.

Figure 3:
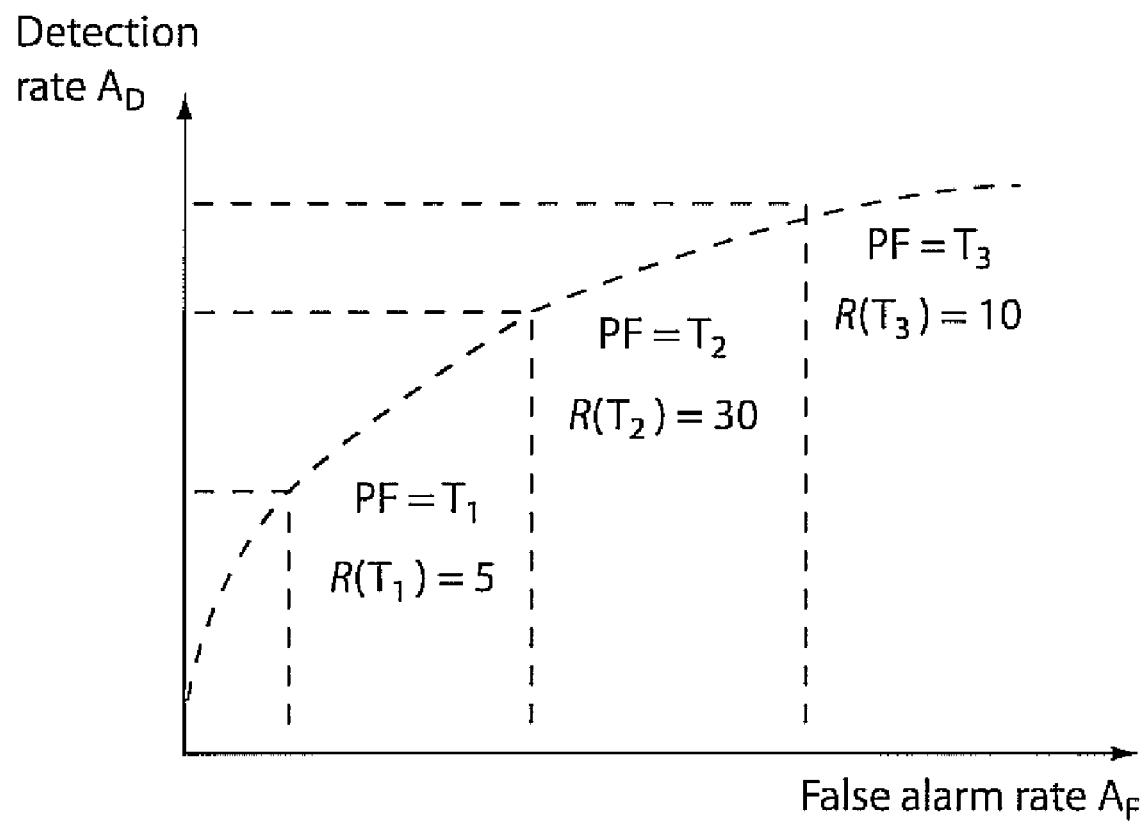
FIG. 3 is a plot for demonstrating reward function optimization in accordance with an illustrative embodiment.

Referring to FIG. 3, detection rate ($A_D$) versus false alarm rate ($A_F$) is plotted. As shown, when a pre-failure interval PF=$T_2$, the prediction model is considered to be optimal since the model achieves the highest reward value $R(T_2)$=30. Note that the predictive failure management framework is generic, and can support other user-defined reward functions.

Adaptive Log Stream Sampling: To achieve accurate failure prediction, the analysis component (e.g., 112 in FIG. 1) wants to receive as much information as possible. Moreover, in dynamic stream environments, the behavior of a monitored object can be time-varying. To achieve workload-resilient accurate prediction, the analysis component wishes to store life-long information about the monitored object (i.e., execution behavior under different input workload conditions). However, a large-scale cluster system can comprise hundreds of computer hosts and thousands of operators. Each host or operator can be associated with tens of metrics. This can impose considerable monitoring overhead if the sensors (108) send the streams of all metric values to the analysis components (112) with fine time granularity.

To address the problem, a new adaptive log stream sampling scheme is presented to provide the most useful information to the analysis component under the system resource constraint.

Figure 4:
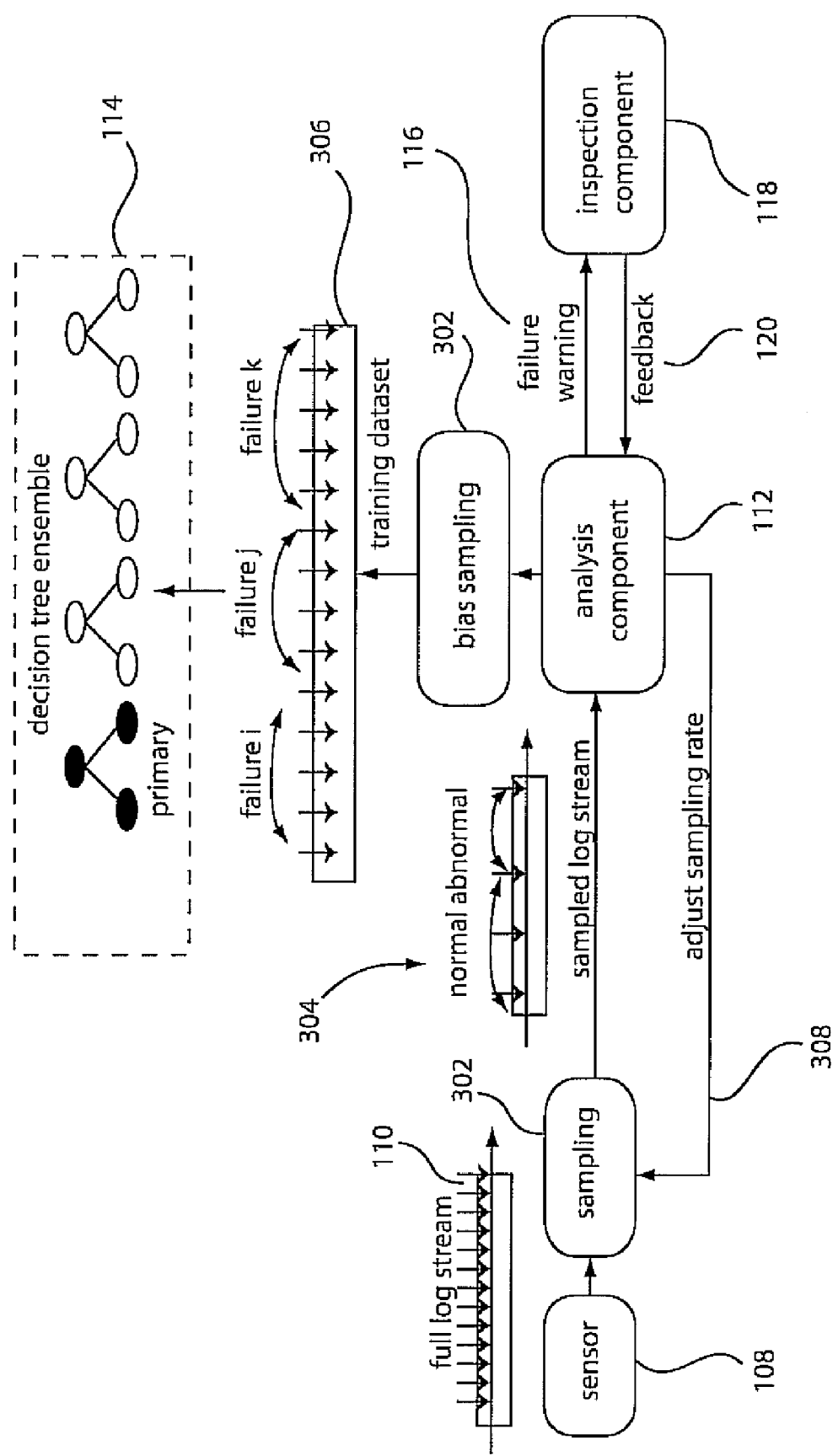
FIG. 4 is a block/flow diagram showing stream based predictive management where metric are sampled in accordance with an object's state in accordance with one aspect.

Referring to FIG. 4, an adaptive-sampling embodiment is shown for the failure management system 104 of FIG. 1. At a high level, a distributed software sensor 108 generates a detailed log stream 110 at fine time granularity, and performs bias-sampling in block 302 on the original log stream 110. Thus, the sensor 108 only sends a subset of log stream samples 304 to the analysis component 112 to reduce network traffic. The analysis component 112 then extracts different failure incident information from the received log stream 304 to form training data 306 for a failure prediction model 114.

Each software sensor 108 deployed at a different stream processing host continuously collects a set of metric values $M_1, \ldots, M_k$ of its local host and all the operators running on the host. For each metric, its dynamic values are sampled periodically at a certain rate 308 to form a time series $M_i = \{m_{i,1}, \ldots, m_{i,t}\}$. Since the application software fault can cause failures at different levels, the system collects the measurement data at not only host level but also at operator level. The monitored metrics associated with a host include available memory, virtual memory page in/out rate, free CPU time, free disk space, and others.

At operator level, the following illustrative metrics have been identified that may be useful for failure predictions: (1) input rate that denotes the average number of input data items received by the stream processing operator per second; (2) output throughput that denotes the average number of result data items generated by the operator per second; (3) data processing time that measures the average time for the operator to process one data item; and (4) buffer queue length that defines the number of data items that are stored in the buffer(s) and wait to be processed.

To survive software failures, the sensor 108 stores a window of recent log data on the local disk. To achieve further fault tolerance for surviving local disk failures, the log data can also be backed up on a nearby neighbor host. The window size can be decided based on the maximum pre-failure interval and the system's failure detection time so as to store enough information to capture a failure incident transiting from normal to pre-failure, then to failure. Thus, the analysis component can retrieve a detailed log stream from the corresponding host's disk to update the prediction model when it fails to predict a failure incident.

To save network bandwidth, each sensor 108 performs sampling of the original log stream and only transmits the most useful information to the analysis component 112 based on the analysis results. The basic idea is to use a low sampling rate when the analysis result is normal and switch to a high sampling rate during the analysis result is abnormal. For each monitored object (i.e., host or operator) whose state is classified as normal by the prediction model 114, a low sampling rate can be used to reduce measurement overhead since detailed measurement is unnecessary. The analysis component 112 makes the adjustment of the sampling rate 308 to sampling block 302. When the prediction model raises a failure alarm on the object, the sampling rate is increased to collect more precise measurement on the suspicious object, which allows the prediction model to make more accurate state classifications and time-to-failure estimations.

Later, if the prediction model classifies the object as normal based on the detailed information, the object returns to a working mode and the sampling rate is reduced. In addition to adapt the sampling rate based on the object state, the sampling rate is also adjusted for different metrics based on their predictive power. More measurement resources are allocated to the metrics that have been selected as key features by the prediction model. Essentially, the adaptive measurement sampling scheme allows the system to perform efficient failure prediction with low overhead.

Reservoir sampling may be employed as described in J. Scott Vitter. "Random sampling with a reservoir." ACM TOMS, 11(1), 1985, incorporated herein by reference. Reservoir sampling incrementally maintains a desired size of training data. Non-uniform sample retention probabilities $p_s$ may preferably be employed to keep the most important data with limited resource cost. For each time instant t, a set of j measurements $<m_{1,t}, \ldots m_{j,t}>$ attached with a state label $L_t$ (i.e., normal, pre-failure, and failure) based on diagnostic feedback and the pre-failure interval. Generally, a higher retention probability $p_s(L_t, m_{1,t}, \ldots, m_{j,t})$ should be employed for more important samples. The most significant factor determining the importance of a set of measurements is its state label. Failure and pre-failure points are rarer than normal points. Thus, the probability of each state is used, and the biasing scheme of C. R. Palmer et al. "Density biased sampling: An improved method for data mining and clustering." In SIGMOD, 2000, incorporated herein by reference, is employed, where $$p_s(L_t = 1) = \frac{\alpha}{N_l^e}, \quad (6)$$

$$\text{where } \alpha = \frac{U}{\sum_l N_l^{1-e}} \quad (7)$$

U is the number of samples we wish to retain, and $N_1$ is the number of points having label 1. The exponent e, $0 \leq e \leq 1$, determines the relative bias. For e=0 the sampling is unbiased (i.e., uniform random with the same probability regardless of $L_t$). For e=1, we retain an equal number of samples from each class, regardless of the original number of points $N_1$ in each class. We should note that, for e>0 and for finite datasets, the retention probabilities may be larger than one for very rare classes. In this case, we set them to 1 and proportionally increase the sampling probabilities, so that the total number of points retained is U. In the experiments, we set e=0.5 and we tried ratios of U/N=50% and 30%, where $$N = \sum_l N_l$$

is the total number of measurement samples.

Model-based Failure Prediction: a failure prediction model encodes necessary knowledge, with respect to a set of measurements, to automatically predict similar, although not identical, behaviors in the future.

Classifier features: Examining a single metric in isolation is not desirable because the metric(s) involved in the failure predicate may be insufficient to capture "suspect behavior" early enough to issue an alarm. For example, say we want to issue an early alarm for processing hot-spots, which might be characterized by, e.g., "processing time>5 ms," and which may be due to memory or buffer exhaustion. The problem is that this predicate is often violated suddenly. Consequently, it is impossible, even for a human, to predict performance degradation early enough by examining the processing time alone. However, all is not lost; there are often other metrics that can provide an early indication of potential problems.

In this example, available free memory and buffer queue length are two such metrics, which are gradually exhausted. Therefore, an intelligent administrator wishing to predict processing hot-spots, would actually watch out for suspect trends not in processing time, but in memory utilization (and possibly other metrics, e.g., number of transactions processed, etc.). In order to effectively and automatically discover the appropriate metrics for prediction, the analytic model has to incorporate multiple measurements in the early stages.

Internal and external features for the classifier will now be described. An initial set of metrics should, in principle, be a superset of those having information that can separate (or, classify) what is normal and what isn't from sensed information. This is the main task of the classifier. From an initial large set of features, we will select just those appropriate for state classification.

Raw features can be broadly divided into two groups, with respect to the fundamental purpose they serve in the present schema: 1) workload features, which are external to the operator and are relatively unaffected when the operator fails. Alternatively, the term external features is employed. An example would be the output rate of an upstream operator (i.e., the data arrival rate before any buffering and queueing in the downstream operator. 2) Operator features, which are affected by failures. We also call these internal features. An example would be the queue length or the data processing rate in the operator under examination. The distinction between external and internal features is or particular interest when workload characteristics evolve.

In situations where workloads do not change significantly over time, the external features are less important, since they may include little useful information. However, when workload characteristics do change and failure characterization is relative to the current workload, we need features to capture its characteristics. These features should be relatively independent from the presence or absence of failures.

State classification: As explained, three possible states may exist in the present example: normal, pre-failure, or failure. The failure predicate can utilize the same metrics as the prediction model, or it can be based on application service level agreements. Furthermore, the failure predicate may be obtained from an administrator or, potentially, by another system component that uses outlier detection (or, in general, unsupervised learning techniques) to agnostically label suspect behavior.

However, predicates that characterize failures more tightly will lead to higher quality models and, therefore, more accurate predictions. Anything that is not a failure or pre-failure is considered normal. The statistical models then provide information such as "at the current time, the state is pre-failure with probability 95%." The present approach is to try a set of different pre-failure intervals and train one classifier using each pre-failure interval. Note that the pre-failure interval decides how many measurement samples preceding the failure time will be labeled as a pre-failure. Thus, a classifier trained by a larger pre-failure interval is more likely to raise failure alarms.

Figure 5:
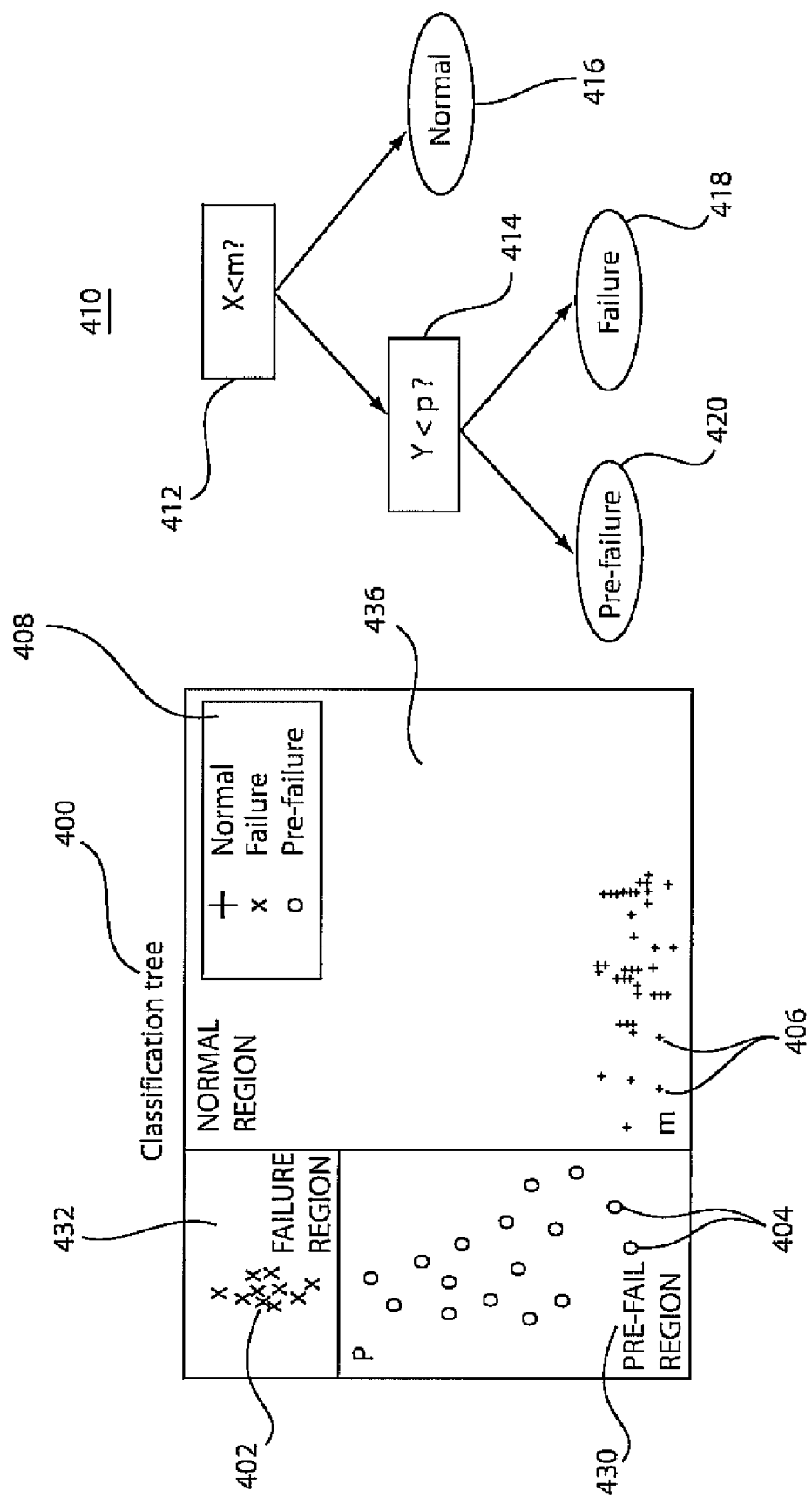
FIG. 5 is a diagram showing state classification using a two-dimensional metric in accordance with an illustrative example.

Referring to FIG. 5, a classifier and classification method are illustratively described. A wide array of statistical or machine learning models may be used, which can also be efficiently updated, such as decision trees, Gaussian mixture models, or support vector machines. In the present example, decision trees are presented, because they produce rules with direct, intuitive interpretations by non-experts. Decision trees essentially apply a sequence of threshold tests on the classification features. FIG. 5 illustrates a classification of points 402, 404 and 406 in feature space 400 for a classification tree in a simple 2-D example. The points 402, 404 and 406 closely follow the memory exhaustion scenario, but are spread out for clearer visualization. Points are located in one of a failure region 432, a pre-failure region 430 or a normal region 436. The x-axis can be thought of as available memory and the y-axis as page-out rate. The predicate that corresponds to a pre-failure region 430 is X<m in block 412 and Y<p in block 414 and can be determined by following the path in a tree 410 which leads to a leaf 420 labeled pre-failure. Also, a failure can be determined in block 414. The predicate that corresponds to normal operation in block 416 is X<m. The inductive bias of decision trees includes this restriction to isothetic (i.e., axis-parallel) decision boundaries, as well as a preference for the shortest trees. A first assumption is reasonable in the present context, since a system state can be successfully characterized by such isothetic boundaries (i.e., threshold tests). Additionally, seeking the smallest set of such tests that can separate the states is desirable for reasons of simplicity, interpretability as well as performance.

Each decision tree classifier is trained on historical measurement data, which are appropriately labeled with one of the three possible states. Periodically, as the history grows based on feedback from the system, the models are re-trained if their accuracy is low. In order to speed up training, biased reservoir sampling may be employed. Even if a small fraction of normal points are kept, fairly accurate decision boundaries can be obtained.

Not all features have equal predictive power for a given outcome (e.g., hard disk temperature may be irrelevant for processing hot-spots) and model complexity needs to be balanced versus accuracy. An additional benefit of decision trees is that they inherently do this, by seeking the shortest possible tree that explains the data. In one embodiment, a ten-fold cross-validation is employed to choose the best pruning level. Aside from improving the simplicity and, thus, interpretability of the tree, cross-validation helps improve the quality of the classifier, particularly when the pre-failure interval PF is excessively large.

If PF is too large, then a significant number of points that should have been labeled as normal will be labeled as pre-failure. However, these "mislabeled" points will typically occupy regions of the measurement space that are also occupied by other normal points before the pre-failure interval. Cross-validation will typically catch this conflict. Therefore, contrary to what one might expect, both detection and false alarm rate stabilize when PF becomes large enough. False alarm rate does not increase significantly, unless PF becomes so large that almost all points are labeled as pre-failure.

So far classification of measurements from individual timestamps has been considered. Next, how this information to raise alarms for potential pending failures is explained. Whenever new measurements arrive, the classifier trained on the log stream to obtain an estimate of the corresponding state label is used. One possibility is to raise an alarm as soon as any label estimate is either pre-failure or failure. However, based on the observation that failures are associated with several consecutive pre-failure or failure labels, it may be advantageous to delay the alarm slightly, so as to avoid false alarms due to transient misclassifications. In other words, it is possible that a "small" number of points isolated in time may be misclassified but this should not cause false alarms. An effective way to define "small" is with respect to the pre-failure interval.

In particular, a majority voting may be employed over the last W time instants, where we set, e.g., W=[(0.1)PF]. Therefore, when a new set of measurements $<m_{1,t}, \ldots, m_{j,t}>$ arrives, we estimate the corresponding state label $\hat{L}_t$. In order to decide whether to raise an alarm at time t, we examine the labels $\hat{L}_{t-W+1}, \ldots, \hat{L}_{t-1}, \hat{L}_t$. If and only if more than W/2 of those labels are pre-failure or failure, then we raise an alarm. We found that this simple scheme significantly reduces false alarms due to transient misclassifications, without affecting the detection rate, since failures produce several consecutive non-normal points. The only downside to this approach is that the alarm may be delayed by as much as W time instants, which is why we chose W equal to 10% of PF. Alternatively, the effective time-to-failure may be reduced by no more than 10% of PF, which is acceptable. Other embodiments may employ other criteria and settings.

When the prediction model raises a failure alarm on an object, the inspection takes proper preventive actions based on the prediction results and triggers the inspection process on the suspicious object.

Figure 6:
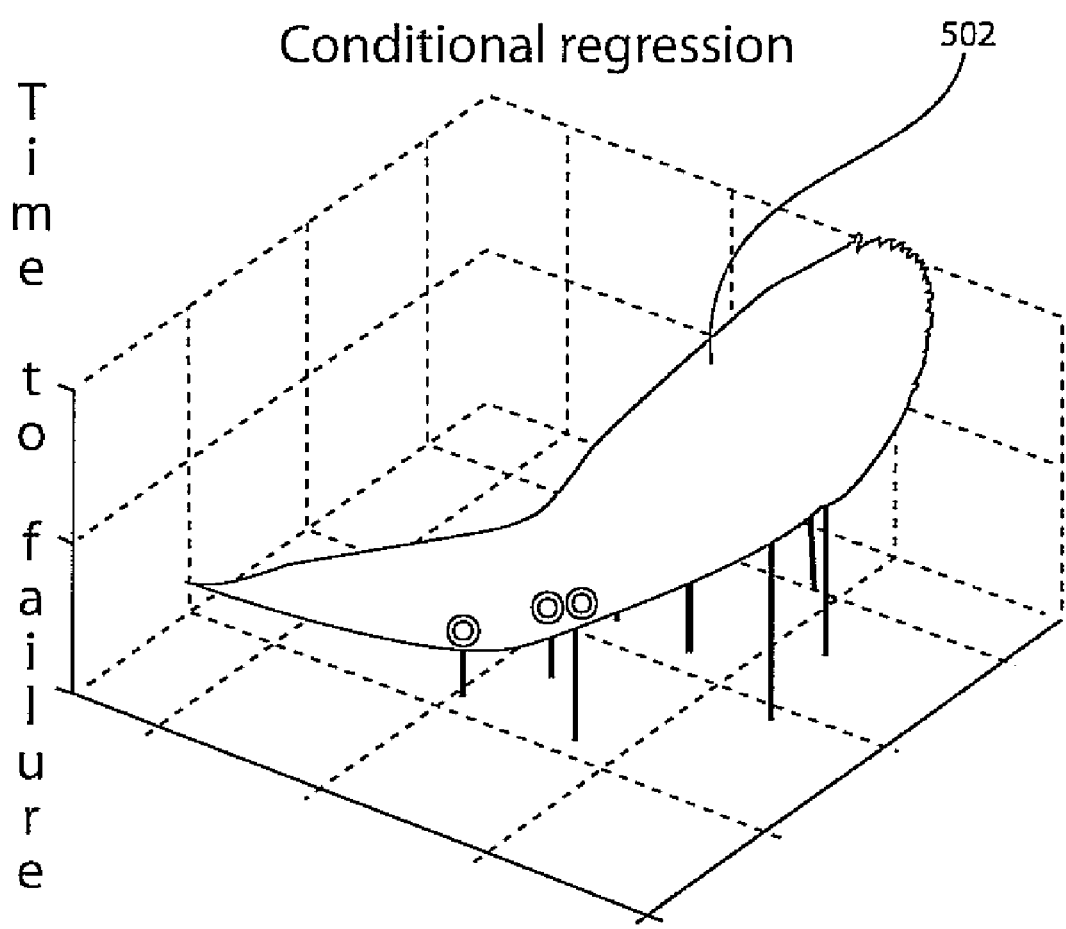
FIG. 6 is a plot showing time to failure regression to determine a time to failure for a component based on metrics or conditions.

Referring to FIG. 6, a time-to-failure regression plot is illustratively shown. The plot is employed in determining or estimating time-to-failure for hosts, operators, objects, etc. During pre-failure it is preferable to know how soon the failure may occur. In one embodiment, time-to-failure can be estimated if and only if the state is pre-failure, since it does not make sense to regress on data points from normal states (failure may never happen) or from failure states (it is already too late). Furthermore, failure and pre-failure states are rare compared to normal states, so they should be treated separately. The model then provides information such as "with a confidence of 95%, failure will occur between 7 and 8 days from now." A surface 502 in FIG. 6 is a function that can estimate time-to-failure, fitted only on pre-failure points (here, via quadratic regression). It has been found that, for the types of failures we consider, the important attributes evolve fairly smoothly. Thus, quadratic regression is sufficient for time-to-failure estimation in the example shown.

Figure 7:
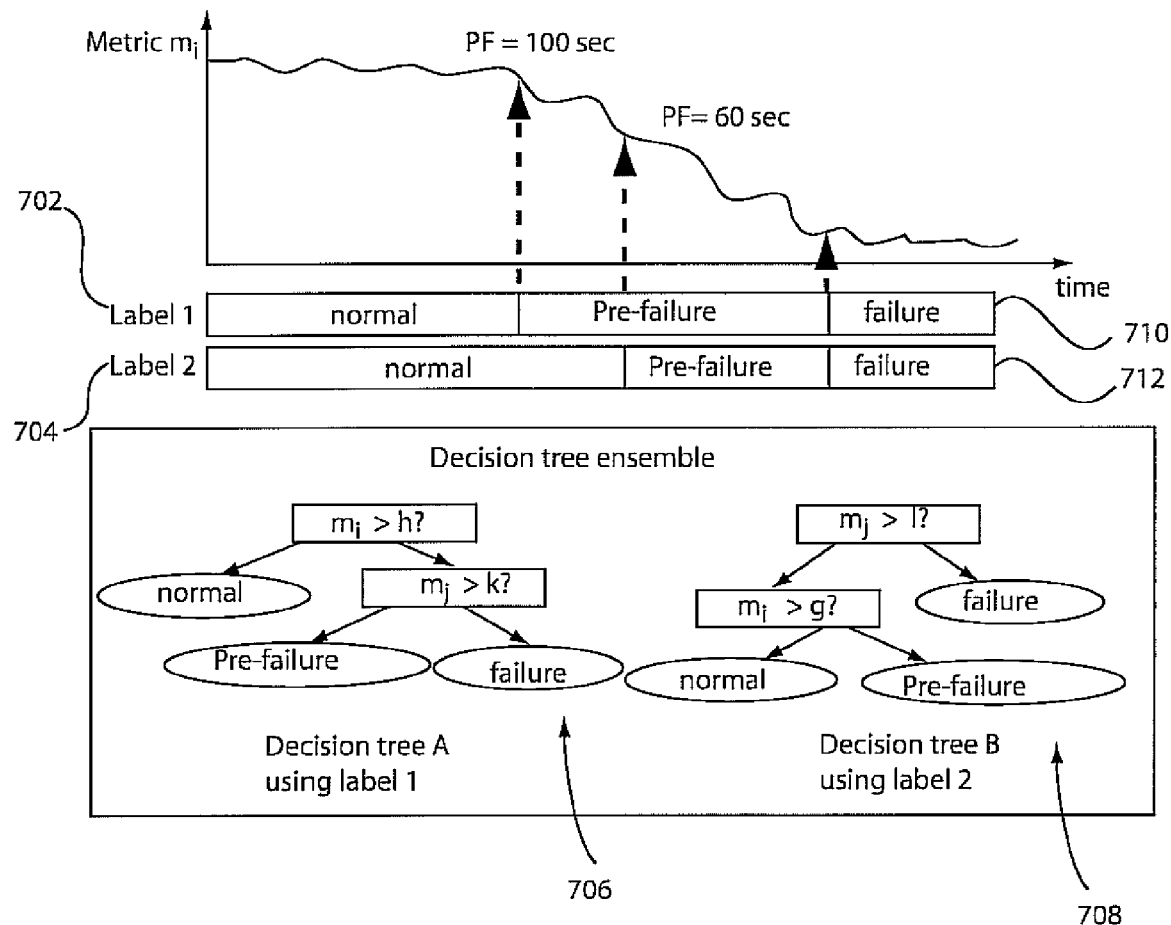
FIG. 7 is a diagram showing failure prediction model selection in accordance with one illustrative embodiment.

Referring to FIG. 7, a failure prediction model adaptation is shown and explained in accordance with the present principles. A failure prediction model needs to be continuously updated to adapt to dynamic stream environments (e.g., variations in external workload, failure penalty and preventive cost). As mentioned, the proactiveness of the prediction model can be adjusted by training its decision trees using different pre-failure intervals. Consider time intervals 710 and 712 for label 1 702 and label 2 704. Different decision trees 706 and 708 may achieve different reward function value based on their detection rate and false-alarm rate. For example, decision tree A 706 uses a larger pre-failure interval that labels more measurement samples as pre-failure. Thus, decision tree A 706 is more likely to generate failure alarms than decision tree B 708.

Whenever the stream environment changes, an optimal decision tree selection process is started that tests an ensemble of decision trees for a time period (e.g., testing period). Thus, if the prediction model is in a testing period, all tested decision trees also perform failure predictions by classifying the received log stream sample. The system records those prediction results for later reference. At the end of the testing period, the system selects the optimal decision tree with the highest reward as the new primal decision tree, The analysis component performs on-line adaptations of its prediction model based on the feedback from the system that informs the analysis component whether its prediction is correct or not. The prediction model can make false-negative prediction errors when it fails to send out warnings for a new failure type. In this case, the predictive failure management scheme uses reactive a failure management approach. However, it is desirable to update the prediction model so that it won't miss the prediction of future failure occurrences. Since the analysis component fails to predict the failure, it may only have a coarse-grained log stream sampled with low rate, which can be insufficient for constructing the new prediction model. Since the sensor monitoring the failed object stores the fine-grained log stream in its local disk, the analysis component first retrieves fine-grained log stream from the remote storage. Failure diagnosis can be performed to understand the failure behavior using tools such as virtual machine replay. Based on the failure symptom, a new prediction model can be created and encoded with a proper failure predicate. Then, a range of pre-failure intervals $PF_{min} \leq PF_0 \leq \ldots \leq PF_k \leq PF_{max}$ can be selected. The tuples of the training streamscan be labeled with states (e.g., "normal", "pre-failure", or "failure" using different selected pre-failure intervals.

An ensemble of decision trees $'Y_0, \ldots, 'Y_k$ can be constructed using different pre-failure intervals $PF_0, \ldots, PF_k$. To avoid future false-negative errors, the prediction model is set to be conservative at the beginning by using $'Y_k$ from the primal decision tree that tends to classify more sample values as the pre-failure state. At the same time, the analysis component triggers the decision tree selection process to perform parallel testing of the decision tree ensembles $'Y_0, \ldots, 'Y_k$ in block 810. At the end of the testing period, the temporary conservative decision tree is replaced by the selected optimal decision tree that has the highest reward.

False-negative or false-positive prediction errors can occur for known failure types when the stream environment experiences changes. For example, an operator failure can exhibit different pre-failure symptoms when the input workload changes. Under these circumstances, we first update the false-negative counter $N_{fn}$ or false-positive counter $N_{fp}$. Similarly, we also update the true-positive counter $N_{tp}$ when the prediction model receives a positive feedback that it has successfully predicted a failure incident. Then, we can calculate the new reward function value R using the updated counters $N_{tp}$, $N_{fp}$, $N_{fn}$. If the reward value drops outside of the desired range, the analysis component starts the parallel testing of the decision tree ensembles and selects the new optimal decision tree for improved reward value. Thus, when the parallel testing of the decision tree ensemble is activated, all the candidate decision trees also update their false-negative, false-positive, or true-positive prediction counters using the feedback. At the end of the testing period, the reward value of each candidate tree can be calculated based on those updated prediction counters.

Since a candidate decision tree can make different predictions as the primal decision tree, we need to properly convert the original feedback by comparing the prediction results of the candidate decision tree and the primal decision tree. For example, if the primal decision tree makes a positive prediction (e.g., raising alarm) and the candidate decision tree makes a negative prediction (e.g., normal), a false-positive feedback to the primal decision tree is converted to a true-positive feedback to the candidate decision tree. As the analysis component accumulates more knowledge about the behavior of a CQ operator, it can continuously update its prediction model to make more accurate and comprehensive failure predictions (e.g., make proper predictions under different workloads).

Essentially, the feedback from the inspection component provides the prediction model with the correct label (i.e., normal or failure) about a historical measurement sample $<m_{1,t}, \ldots, m_{j,t}>$ that can be used as training data for the decision tree ensembles. The pre-failure labels are added later for each decision tree according to its pre-failure interval where the prediction model marks a set of training samples preceding the failure samples as pre-failure. The decision tree ensembles dynamically update themselves whenever new useful training data are collected, especially after a new failure incident has been captured.

Figure 8:
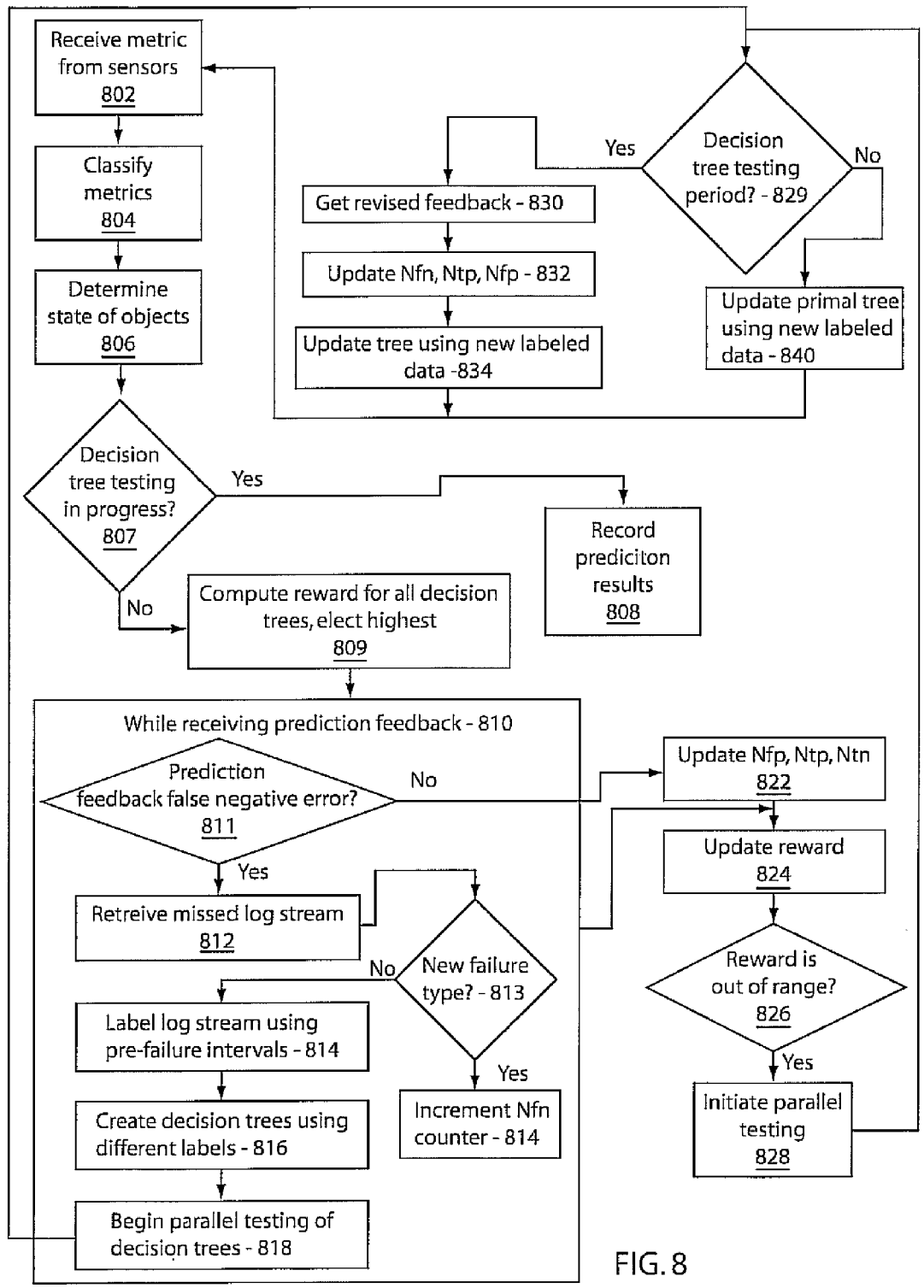
FIG. 8 is a block/flow diagram showing a system/method for self-evolving predictive failure management for cluster systems where predictive models are updated during the predictive operations in accordance with one embodiment.

Referring to FIG. 8, an adaptive failure prediction system/method are illustratively shown in accordance with one embodiment. In block 802, metrics are received from sensors placed in a network or objects, hosts or operators being monitored.

In block 804, the metrics are classified using a primal or most conservative decision tree of the classifier. In other embodiments, a selected or customized decision tree or other classifier type may be employed. In block 806, a determination of the state of the objects etc. is made. If abnormal samples are received a failure alarm is raised.

In block 807, if a decision tree testing period has been initiated, prediction results of tested decision trees are recorded in block 808. If the decision tree testing period is not in progress, a reward (R) is calculated for all decision trees to elect the best decision tree (highest reward) in block 809.

While receiving prediction feedback in block 810, a false negative error is determined in block 811, the missed log stream is retrieved in block 812. If the false negative error is a new failure type described by a predicate in block 813, then label the log stream using pre-failure intervals in block 814, create decision trees using different labels in block 816 and start parallel testing of the decision tree ensemble in block 818. Otherwise, if the prediction feedback is a known failure type in block 820, than increment the $N_{fn}$ counter (e.g., $N_{fn}=N_{fn}+1$).

The prediction feedback information is otherwise employed to update $N_{fp}$, $N_{tp}$, and $N_{fn}$ in block 822. In block 824, the reward value R is updated based upon the update counts. If R is out of a desired range in block 826, parallel testing is initiated for the decision tree ensembles in block 828.

If during the decision tree ensemble testing period, for all decision trees $'Y_i$ for i from 0 to k: Get revised feedback based on a prediction of $'Y_i$ in block 830; update $N_{fn,i}$, $N_{tp,i}$, $N_{fp,i}$ in block 832; and update $'Y_i$ using new labeled data in block 834. Otherwise, update $'Y_{primal}$ using the new labeled data in block 840.

Suspicious Object Inspection: an inspection component that is connected with other cluster system management components performs proper preventive actions for minimizing the impact of anticipated failures. Based on the classification results, a monitored object can be operated under three different modes: (1) working mode, (2) inspection mode, and (3) repair mode. The object is said to be in the working mode if its current measurement data are classified as normal by all failure types. When the object is classified as pre-failure by at least one failure type, the object is put into the inspection mode. As mentioned above, the system monitors an object in the inspection model more closely using a higher sampling rate. Based on the detailed measurement information, the prediction model continues to evaluate the object state as long as the object stays in the pre-failure state. To avoid infinite inspection on the object that is mistakenly classified as pre-failure by the prediction model, we set an upper-bound on the inspection time based on the past observations (e.g., maximum observed time-to-failure interval). The inspection will be automatically released when the inspection times out. If a failure does happen later, as predicted, the object transfers into the repair mode.

The system performs failure diagnosis and proper repair actions on the object depending on the failure type. The object returns to the working mode after failures are properly recovered. The system also sends a positive feedback to the prediction model that it has predicted a failure successfully. If the object state is classified as normal later or the inspection times out, the system considers the prediction model issues a false-alarm. The object under inspection returns to the working mode and the system sends a negative feedback to the prediction model to notify that it has issued a false alarm.

Prevention for failing operator: If the failing object is just one operator, we can first isolate the suspicious operator from other operators running on the same host. The isolation can be achieved by running the suspicious operator in a separate virtual machine from the other normal operators, The isolation serves at least two purposes: (1) confining the scope of expected software failure; (2) collecting important pre-failure measurements for the prediction model. To achieve fault tolerance, we also create a temporary replacement operator on the other working host that processes the same input stream(s) as the suspicious operator in parallel. If the operator failure is caused by a known software defect, we can then apply proper patch to the replacement operator immediately to avoid another failure incident. Otherwise, the replacement operator still carries the software faults and may experience failure later. However, the replacement operator delays the failure incident by starting from a clean state on a clean machine, which buys time for the system to correct software fault.

In the mean time, the downstream operator(s) will ignore the output stream(s) from the suspicious operator and use the output from the replacement operator instead. If a failure happens, as predicted, the failed operator is removed from the system and the replacement operator will be used by the query permanently. We can then perform failure diagnosis on the failed operator using various failure diagnosis tools on the collected pre-failure information. If the predicted failure does not happen (i.e., the prediction model issues a false alarm), the inspected operator returns to the working mode. The system releases the isolation on the inspected operator and removes the replacement operator from the system. The downstream operator(s) will be notified to process data from the original operator instead of the replacement operator.

Prevention for failing host: If the failing object is a host running several operators, the preventive action may involve more steps. First, we want to migrate normal operators from the failing host to a working host. A operator is said to be normal if the system is sure that the operator is not the cause of the host failure. By migrating the normal operators out, we can avoid the penalty of the anticipated host failure on those queries involving normal operators. Second, we let those suspicious operators that might be the cause of the host failure continue to run on the failing host for collecting pre-failure information. In parallel, we also create temporary replacements for those suspicious operators on working hosts to achieve fault tolerance. If a predicted failure does happen, the host transfers into the repair mode and those temporary replacement operators become permanent.

Next, we can perform failure diagnosis to identify the cause of the failure. If the host failure is caused by the software bugs in some problematic operators, we also need to perform software patch on their replacement operators to avoid future failure occurrences. If the failure prediction model issues a false alarm, the host is set back to working mode, which can provide resources for existing or new operators. We also remove those temporary replacement operators from the system since they are no longer needed.

Figure 9:
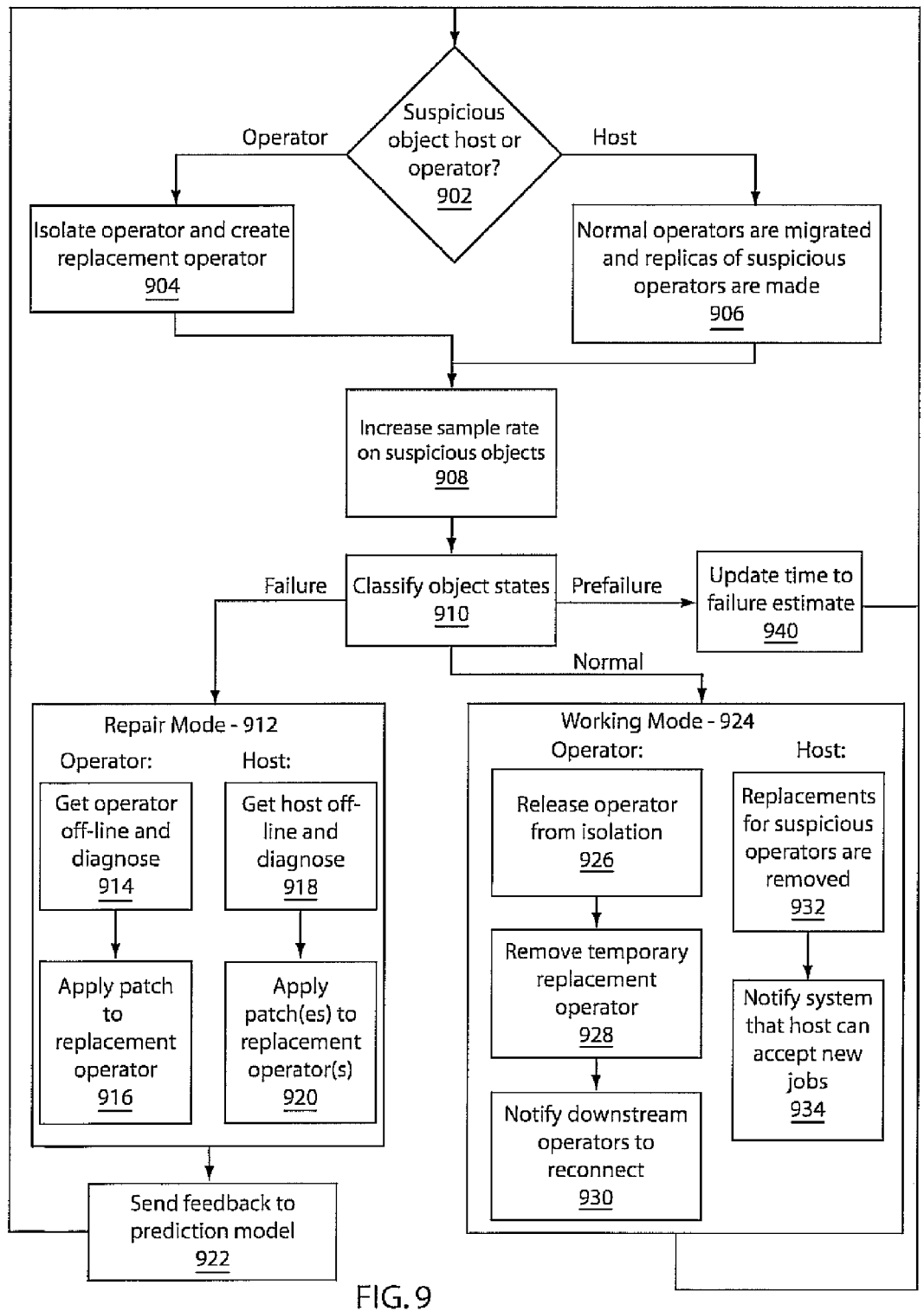
FIG. 9 is a block/flow diagram showing a system/method for handling suspicious objects (preventative actions) in accordance with one embodiment.

Referring to FIG. 9, a system/method for inspecting a suspicious object is illustratively depicted. In block 902, a determination of whether the suspicious (possibly failing) object is an operator or a host is made. If the object is an operator, the operator is isolated and replacement operator is created in block 904. Otherwise, in block 906, for the host, normal operators are migrated and replicas of suspicious operators is performed. In block 908, the adaptive sampling rate is increased on the suspicious object.

In block 910, a state of the object is classified. If the state is failure, the object transfers to the repair mode in block 912. The repair mode for an operator includes getting the operator offline and diagnosing the operator in block 914. Then, a software patch is applied on the replacement operator in block 916. If the object is a host, the repair mode for a host includes getting the host offline and diagnosing the host in block 918. Then, a software patch(es) is/are applied on the replacement operators for the host in block 920. In block 922, positive feedback is sent to the prediction model.

If the state is normal or inspection times out, the object returns to working mode in block 924. If the object is an operator, then the working mode includes releasing the operator from isolation in block 926, removing the temporary replacement operator in block 928 and notifying downstream operators to reconnect to the operator in block 930. If the object is a host, the replacements for suspicious operators are removed in block 932, and the system is notifying that the host can accept new jobs in block 934, In block 936, negative feedback is sent to the prediction model. If the state is pre-failure, update the time to failure estimate in block 940.

Pre-failure time intervals can be obtained using historical data. A simple approach is to label as pre-failure the time interval of duration T, before failure. Alternatively, users may provide labels for a few points. Unlabelled points can be used to refine the pre-failure interval, using standard techniques such as expectation maximization (EM).

Having described preferred embodiments of systems and methods for predictive failure management (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A system for using continuous failure predictions for proactive failure management in distributed cluster systems, comprising:

a sampling subsystem configured to continuously monitor and collect operation states of different system components;

an analysis subsystem configured to build classification models to perform on-line failure predictions; and a failure prevention subsystem configured to take preventive actions on failing components based on failure warnings generated by the analysis subsystem, wherein a pre-failure state of a component is dynamically decided based on a reward function that denotes an optimal trade-off between failure impact and prediction error cost.

2. The system as recited in claim 1, wherein the distributed cluster system includes at least one of hardware and software components.

3. The system as recited in claim 1, wherein the system components of the system at any given time instant are characterized by a state which relates to normal or abnormal operations of the component.

4. The system as recited in claim 3, wherein the states include at least one of the following: a failure state which characterizes situations that are problematic and need action to avoid problems in the future; a pre-failure state which characterizes situations that lead up to a failure and include information to detect an impending failure; and a normal state which characterizes all other situations.

5. The system as recited in claim 3, wherein the states are estimated based on a set of observable metrics.

6. The system as recited in claim 1, wherein the components include a plurality of operation modes based on an observed component operation state.

7. The system as recited in claim 6, wherein the operational modes include at least one of: a working mode component state which is classified normal for all failure types; an inspection mode component state which is classified as pre-failure by at least one failure type; and a repair mode component state which is classified as a failure and failure diagnosis and recovery are performed.

8. The system as recited in claim 1, wherein the sampling subsystem adaptively adjusts a sampling rate of each monitored component based on its state, such that a higher sampling rate is employed for an object in the pre-failure or failure state and a lower sampling rate is used for an object in a normal state.

9. The system as recited in claim 1, wherein the sampling subsystem employs reservoir sampling to maintain a limited size of a training data set.

10. The system as recited in claim 1, wherein the reward function incorporates failure penalty and failure management cost.

11. The system as recited in claim 1, wherein the analysis subsystem builds a state classification model based on historical data.

12. The system as recited in claim 11, wherein the analysis subsystem classifies a monitored component into a pre-failure state and estimates a time-to-failure based on a set of observable metrics.

13. The system as recited in claim 11, wherein the analysis subsystem dynamically adapts the state classification model based on feedback.

14. The system as recited in claim 11, further comprising a parallel classification model ensemble testing module employed to select an optimal prediction model to optimize a reward function.

15. The system as recited in claim 11, further comprising a stream classifier configured to incrementally update classification models.

16. The system as recited in claim 1, further comprising an iterative inspection module configured to take preventive actions on components where a failure alarm has been raised.

17. The system as recited in claim 16, wherein the preventive actions include component isolation, component migration, and replication actions based on predicted failure types.

18. A method for proactive failure management in distributed cluster systems, comprising:
continuously monitoring and collecting operation states of different components, which include at least one of software and hardware components;
building classification models to perform on-line failure predictions for the components;
taking preventive actions on failing components based on failure warnings generated by the failure prediction; and
dynamically adapting state classification models based on feedback such that parallel classification models we employed to select an optimal prediction model that can optimize a reward function.

19. The method as recited in claim 1, further comprising adaptively adjusting a sampling rate of each monitored component based on a state of the component, using a higher sampling rate for an object in a pre-failure state or failure state and using a lower sampling rate for an object in a normal state.

20. The method as recited in claim 19, wherein the pre-failure state is dynamically decided based on a reward function that denotes an optimal trade-off between failure impact and prediction error cost.

21. The method as recited in claim 18, further comprising estimating a time-to-failure for components whose state is classified as pre-failure based on a set of observable metrics.

22. The method as recited in claim 18, wherein taking preventative actions includes taking preventative actions on the components where a failure alarm has been raised using an iterative inspection, the preventative actions including at least one of isolation, migration, and replication actions based on predicted failure types.

23. A computer program product for proactive failure management in distributed cluster systems comprising a computer useable storage medium including a computer readable program, wherein the computer readable program when executed on a computer causes the computer to perform the steps of claim 18.

24. A system for using continuous failure predictions for proactive failure management in distributed cluster systems, comprising:
a sampling subsystem configured to continuously monitor and collect operation states of different system components wherein the sampling subsystem adaptively adjusts a sampling rate of each monitored component based on its state, such that a higher sampling rate is employed for an object in a pre-failure or failure state and a lower sampling rate is used for an object in a normal state;
an analysis subsystem configured to build classification models to perform on-line failure predictions; and
a failure prevention subsystem configured to take preventive actions on failing components based on failure warnings generated by the analysis subsystem.

* * * * *